United States Patent [19]

Witehira

[11] Patent Number: 4,883,728
[45] Date of Patent: Nov. 28, 1989

[54] BATTERY SYSTEMS

[76] Inventor: Pita Witehira, 34 Cowley Drive, Temple View, Hamilton, New Zealand

[21] Appl. No.: 248,715

[22] Filed: Sep. 26, 1988

[30] Foreign Application Priority Data

Mar. 3, 1987 [NZ] New Zealand .................. 223730
Oct. 12, 1987 [NZ] New Zealand .................. 222123
Dec. 16, 1987 [NZ] New Zealand .................. 222936

[51] Int. Cl.⁴ .................................. H01M 10/12
[52] U.S. Cl. ............................ 429/160; 429/225; 180/270
[58] Field of Search ............ 429/9, 149, 152, 160, 429/225, 178, 53; 320/39, 49; 180/270

[56] References Cited

U.S. PATENT DOCUMENTS

| | | | |
|---|---|---|---|
| 3,242,009 | 3/1966 | Schilke | 429/9 |
| 3,434,883 | 3/1969 | Babusci et al. | 429/225 X |
| 3,475,221 | 10/1969 | Jordan et al. | 429/9 |
| 3,883,368 | 5/1975 | Kordisch et al. | 429/9 |
| 3,973,991 | 8/1976 | Cestaro et al. | 429/225 |
| 4,173,066 | 11/1979 | Kinsman | 29/623.1 |
| 4,204,036 | 5/1980 | Cohen et al. | 429/162 X |
| 4,473,623 | 9/1984 | Jshikura et al. | 429/225 X |
| 4,769,299 | 9/1988 | Nelson | 429/57 |
| 4,770,954 | 9/1988 | Noordenbos | 429/9 |

Primary Examiner—Anthony Skapars
Attorney, Agent, or Firm—Knobbe, Martens, Olson & Bear

[57] ABSTRACT

The present invention relates to batteries and battery systems. In particular, a battery is described which comprises a container which houses a plurality of cells. Each of the cells share a common negative terminal. Two or more positive terminal cells are provided. The specification also describes the use of such batteries to power the cranking and auxiliary circuits according to a cell discharge management scheme. Methods of forming such batteries are disclosed in which alternate positive and negative electrode plates are provided and methods of forming such plates are disclosed in which laminated grids are provided and by varying the number of laminations thick and thin plates can be provided with different discharge characteristics.

20 Claims, 9 Drawing Sheets

BATTERY SYSTEMS

BACKGROUND OF THE INVENTION

This invention relates to Electric Storage Batteries. It has particular but not sole application to Automotive Starting, Lighting & Ignition Batteries, hereinafter referred to as SLI Batteries.

The conventional automotive SLI battery consists generally of six 2.2 volt Lead Acid cells connected in series. It is a primary function of the automotive battery to provide sufficient high electric current at short intervals to crank the internal combustion engine in order that it may start. The battery must also provide current to the coil in order to supply ignition at the spark plugs.

Another important function which must also be provided is that of reserve current to provide lighting and ignition for the vehicle if the vehicle's generator is not working.

The current requirements of the starter motor are vastly different from those of the vehicle's auxiliaries, such as ignition and lighting. On the one hand, cranking requires large amounts of current for a relatively short duration as the starter motor cranks the internal combustion engine against the compression of the cylinders. Ignition and other vehicle auxiliaries, however, require lower current rates but for longer periods of time.

The conventional SLI battery system is therefore designed first to provide sufficient cranking power, secondly to provide current to the ignition and coil and thirdly to provide current to the vehicle's auxiliaries whilst the generator is not working. One other function is to act as a voltage load leveller as part of the vehicle's electrical circuits whilst the generator is operating.

The conventional SLI battery system is an advanced version of the original Plante reversible cell. During it's development, the basic principles utilized by Plante have still been retained up to the present time. That is, the battery consists of a series of cells having two opposing electrodes. The cells produce 2.2 volts generally. This configuration has proved to be suitable as a starter battery.

When batteries were first adapted for the supply of starting current, the automobile was quite different to what it is at present. Indeed, the motor vehicle has changed quite markedly in comparison to the battery. It is no longer as important to supply just cranking current for the vehicle. The modern vehicle is equipped with many electrical and electronic devices which present a major contrast in auxiliary current requirements for the battery.

Vehicle manufacturers, whilst incorporating the various extra auxiliaries into the vehicle, are merely responding to consumer demands. These extra auxiliaries place further demands on a battery system which is becoming more and more obsolete because it was always designed primarily as a starting battery. Indeed, the starting function is still the major function of the battery but it is now obvious that changes in automobile designs must also demand changes in battery design to keep pace with consumer demands for more auxiliary power.

Attempts to overcome these problems have been made by a number of people. Thus U.S. patent specification No. 406822 in the name Dey shows a battery which is divided into two cell groups by an internal dividing plate. U.S. Pat. No. 1924959 in the name of Patterson shows four cells two of which are in series and two of which can be between parallel or series combinations by the throwing of a switch. The cells are totally separate. U.S. Pat. No. 3029301 in the name of Strider shows a construction in which two battery parts are provided in series so that six and twelve volt voltage sources can be provided. U.S. Pat. No. 3242009 in the name of Schilke shows the construction in which two battery parts are provided but these are used to provide a number of different voltages. U.S. Pat. No. 3475221 in the name of Jordan shows two separate batteries in one container.

U.S. Pat. No. 3758345 in the name of Toth shows a construction in which a small auxiliary battery is provided in a shaped recess formed in the main plate. U.S. Pat. No. 3883368 in the name of Kordesch shows a construction in which two or more current rates are provided by the use of different types of electrode and, U.S. Pat. No. 4684580 in the name of Cramer shows a construction wherein the casing for the battery has a pocket or recess into which a second or auxiliary battery can be provided. None of these specifications show a construction wherein the problems of the large but short duration current required for cranking and the lower but longer duration demand required by the auxiliaries is able to be coped with in a single battery construction. U.S. Pat. No. 3883368 does indicate a battery which is able to cope with differing current rates but this is only achieved by the use of different types of electrodes. Such an approach is impractical as a SLI battery. U.S. Pat. No. 4684580 in the name of Cramer could provide a construction in which different current draw offs are provided but this is achieved only by the use of two quite separate and distinct batteries, one of which is able to be mounted on the other. Such double battery constructions require extensive changes to be made to the vehicle electrical architecture.

It is therefore an object of the present invention to provide a battery which will obviate or minimize the foregoing disadvantages or which will at least provide the public with a useful choice.

SUMMARY OF THE INVENTION

Accordingly, in one aspect the invention consists in a battery including a container, one or more cells in said container, the or each said cell having therein at least one positive plate and at least one negative plate, at least some said plates being formed by laminations.

In a further aspect, the invention consists of a battery comprising a container having a plurality of cells, said plurality of cells including at least two positive terminal cells and at least one negative terminal cell, each cell containing a plurality of alternating positive and negative electrode plates separated from each other and constituting a cell element stack, each of said plates including active material, the positive electrode plates of the cell element stack in each positive terminal cell being electrically connected to a positive terminal, the negative electrode plates of the cell element stack in the or each negative terminal cell being electrically connected to a single negative terminal, each electrode plate of each cell element other than a said terminal cell being electrically connected in series to the electrode plate of opposite polarity in an adjoining cell, the cells of each series of connections being electrically connected to one common negative terminal but having separate positive terminals; and an electrolyte in contact with the positive and negative electrode plates in each cell.

In a still further aspect, the invention consists in an automobile electrical system comprising a battery with first a heavy current conductor cable connected to the battery negative terminal and earthed to said automobile, second a current conductor cable connected to one or more positive terminals of said battery and connected to a current first switch, said current switch being connected to the electric starter motor of said automobile, third a current conductor cable connected to one or more of the battery's positive terminals and to the auxiliary circuits of said automobile, fourth a current electrical conductor cable connected to one positive terminal not engaged by said second current connector cable, said fourth current conductor cable being in common circuit with the generator circuit line of said automobile, then to a second switch, fifth a current conductor cable from said second switch connected to said terminal engaged by said first current conductor cable.

The present invention also consists of a Lead-Acid Battery comprising a container having a plurality of cells including positive and negative terminal cells, each cell containing a plurality of alternating positive and negative electrode plates separated by means of a separator and constituting a cell element stack. Each of said plates is comprised of a grid having active material pasted thereon. The positive electrode plates of the cells are connected electrically. Similarly, the negative electrode plates of the cell are connected electrically. The electrode plates of each cell are electrically connected in series parallel. That is, an even number of cells are connected in series, parallel to another even number of cells also connected in series but sharing the same negative electrical connection at the negative terminal.

Half of the cells contain thicker positive electrode plates made up by the lamination of thinner plates whilst the other half have thinner positive electrode plates. All negative electrode plates are of the same thinner size.

This invention therefore provides for a battery having two sets of cells arranged in series parallel, thus providing dual or multi current variations at the positive terminals. That series of cells having the thinner positive plates provide high current from the connected positive terminal for short durations. The other series of cells, having thicker laminated positive plates, have less plates per volume space, however the current capacity is equal to the cells having thinner plates, during longer slower discharges of the battery.

The present invention therefore provides the vehicle manufacturers and owner with a dual or multi current battery that for cranking purposes will provide high current flows through the cells having thin positive plates with this high current available for shorter durations. A lower but longer current flow is also available from the cells having thicker laminated positive plates. Whilst both sets of cells can be connected electrically for cranking purposes, only the cells having the thicker laminated plates are connected electrically to the automobiles auxiliary circuits, thus providing for slower and longer discharge periods.

During recharging of the cells, all cells are connected electrically and thus the reverse cycle is occurring as in a conventional Lead Acid Battery. This is made possible because all cells share a common negative terminal to earth.

To those few skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

In the following more detailed description of the invention, reference will be made to the accompanying drawings in which;

DETAILED DESCRIPTION OF THE PREFERRED EMBODIMENT

Figure 1:
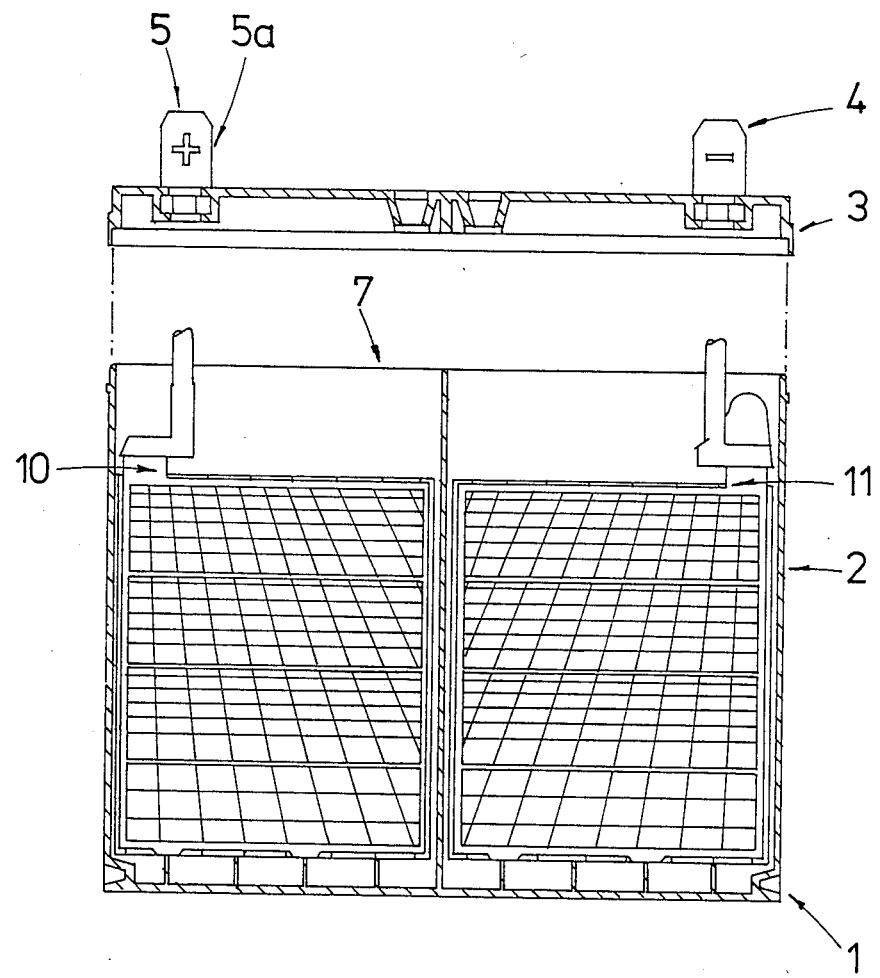
FIG. 1 is a side elevation of the battery sectioned through two cell compartments.

While the invention will be described in connection with preferred embodiments, it will be understood that the invention is not intended to be limited to the preferred embodiments. On the contrary, all alternatives, modifications and equivalents as may be included within the spirit and scope of the present invention will be defined in the appended claims. Thus, while the present invention will be described in conjunction with an SLI Automotive Battery, it should be appreciated that the invention is equally applicable to any other Lead-Acid Battery application. Indeed, the present invention can be adapted to use with an absorbed electrolyte type of battery as opposed to the flooded-electrolyte battery illustrated herein.

Use of the present invention will be particularly advantageous in applications which require high cranking power combined with longer and slower power draw off encased within one casing and having dimensions equivalent to conventional SLI batteries.

In general, the present invention is predicated on the discovery that, by a unique combination of physical parameters, as will be discussed hereinafter, a Lead-Acid battery can be provided which is characterized by dual or multiple or single current flow with the ability to maintain a minimum required cranking capacity during use and or after prolonged use of auxiliary circuits which require lower and slower current flow characteristics.

This performance characteristic can be provided for within the physical parameters of a conventional battery as set forth herein. The conventional SLI battery, as previously mentioned, requires a reserve capacity to comply with International standards. The reserve capacity of the conventional battery is calculated on the basis that should a battery's capacity drop to 25% of normal, it must still be capable of cranking the internal combustion engine.

The present invention therefore sets out to overcome the problem of longer slower discharges using up the available high discharge capacity required. The present invention hereinafter describes how by weight and volume it is possible, by "optimized configuration", to achieve a dual or multi current system within standardized battery container sizes. In this instance, advantages of the present invention are in cost savings and compatibility with conventional batteries.

The present invention can also be characterized in relation to Total Cranking Capacity when by electrical switching, it is possible to obtain full use of all active material within the battery for usual day to day use as a conventional SLI battery. By electrical circuit design, it is also possible to isolate that section of the battery characterized by plate design described herein as best suited for slower and longer current drawoff than cranking requires. By switch or circuit design, the present invention also prevents use of the cranking capacity by the auxiliary circuits within an automobile.

The present invention will show that battery durability is increased substantially by distinguishing specific current requirements within the optimized configuration.

Turning now to a more detailed description of the present invention, there is shown in FIGS. 1 to 5 a preferred embodiment of a 12 volt 12 cell battery of the present invention.

FIG. 1 shows a battery (1) with a premoulded container, (2) with cover (3) lifted which will be attached to the container by suitable means. (4) is a negative terminal post while both (5) and (5a, obscured) are positive terminal posts. While the terminal posts are illustrated as top terminals, side terminals or other terminal configurations could likewise be employed.

Each cell, as illustrated by FIG. 1, has a plurality of independent, alternately disposed, positive electrode plates (10) and negative electrode plates (11). The plates (10) and (11) are disposed generally perpendicularly and parallel to the partitions (7) but may also be at right angles.

Figure 2:
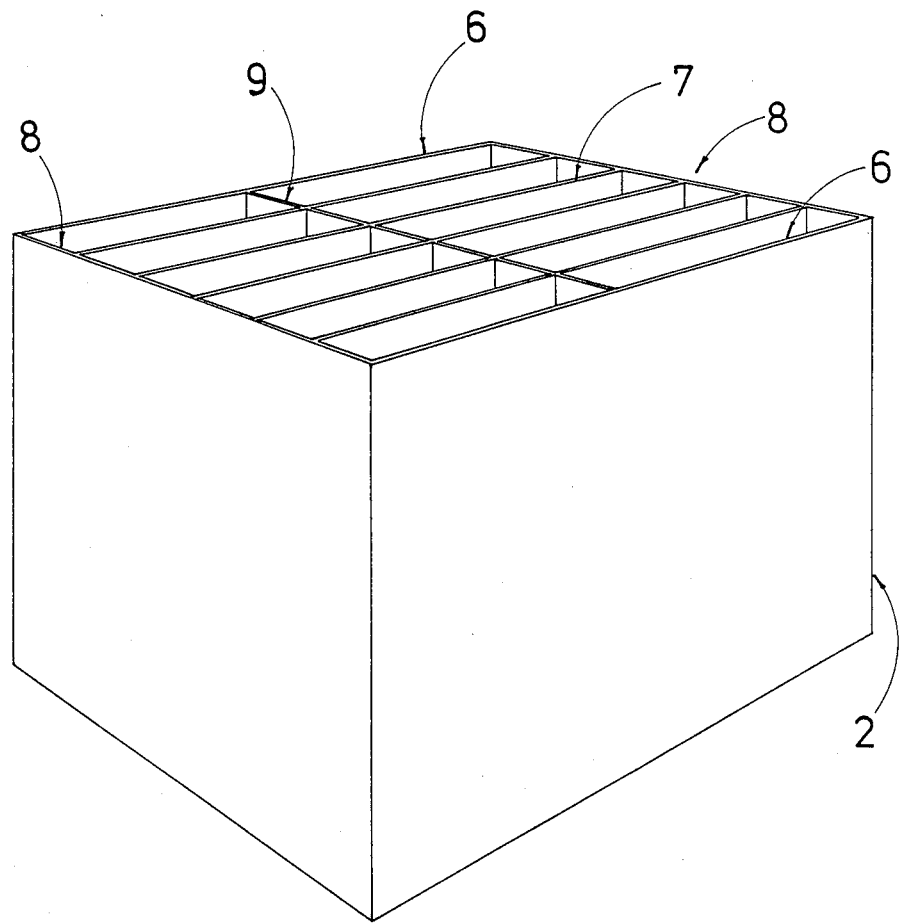
FIG. 2 is a perspective view of the monobloc injection moulding of the battery showing internal partitions.

The container, as best seen in FIG. 2, is divided into a plurality of cell compartments by integrally formed partition walls (7) which lie essentially parallel to the end walls (6) of container (2) and at right angles to a further partition (9) which runs parallel to walls (8) thus providing 12 cell compartments within the container. Whilst illustrated as 12 cell running in parallel to walls (8), other configurations could likewise be employed. Wall (9), for example, is not required when "absorbed" electrolyte is employed. Wall (9) is essential when flooded electrolyte is employed.

Figure 3:
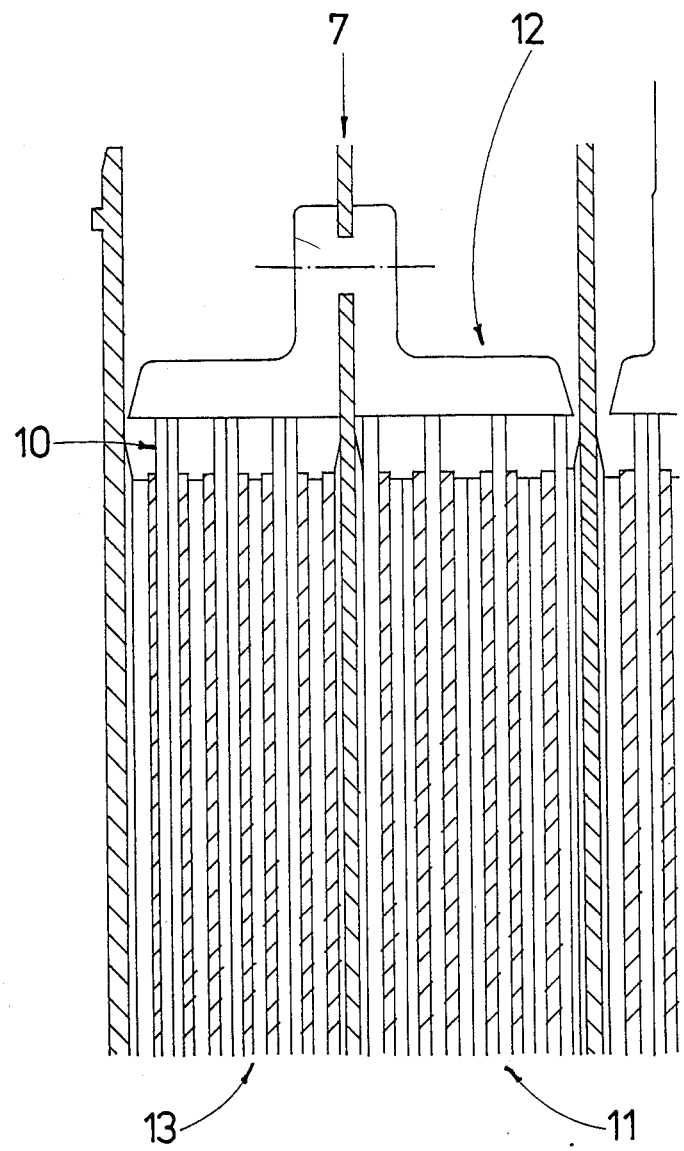
FIG. 3 is an enlargement of the cells having thicker laminated but less positive plates showing intercell connections.

FIG. 3 sets forth an example of alternative laminated positive electrode plates (10) from end on and conventional negative electrode plates (11). A series connection through wall (7) is also illustrated by use of conventional lead straps (12). Separators (13) are also illustrated as in conventional flooded electrolyte cells. However, absorbed electrolyte may also be used as separators in a further aspect.

Figure 4:
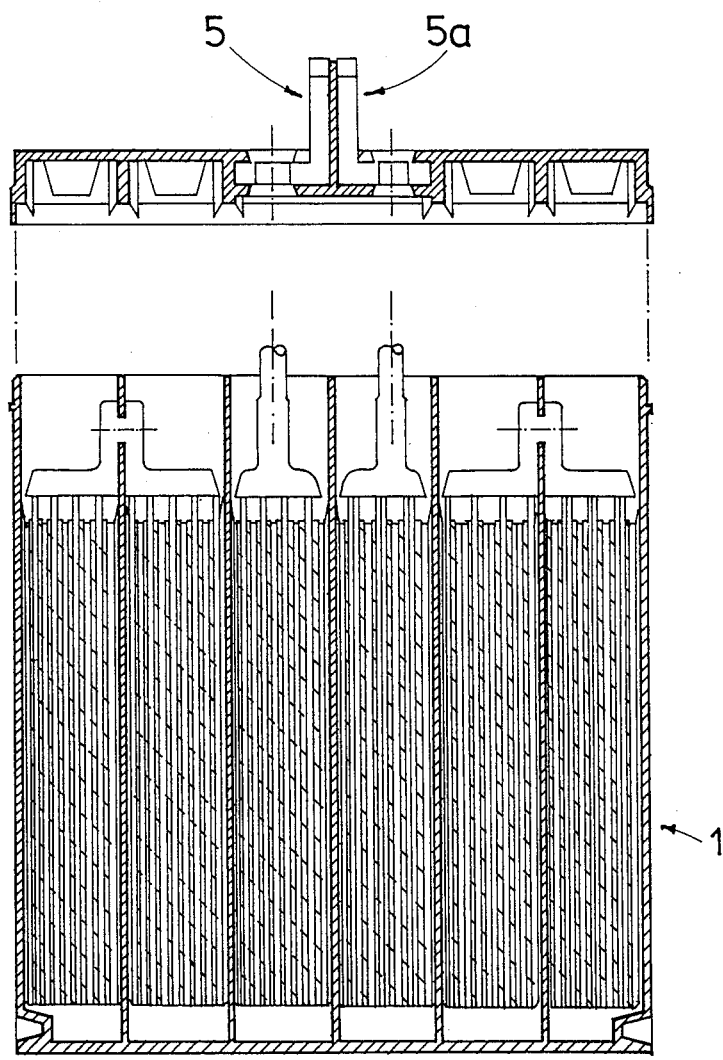
FIG. 4 is an end elevation of the battery sectioned through the positive terminals.

FIG. 4 shows a section through the positive terminals (5) and (5a) of the present invention in a dual current configuration as separate from a multi-current configuration and indicates positive terminals (5) and (5a) in close proximity.

Figure 5:
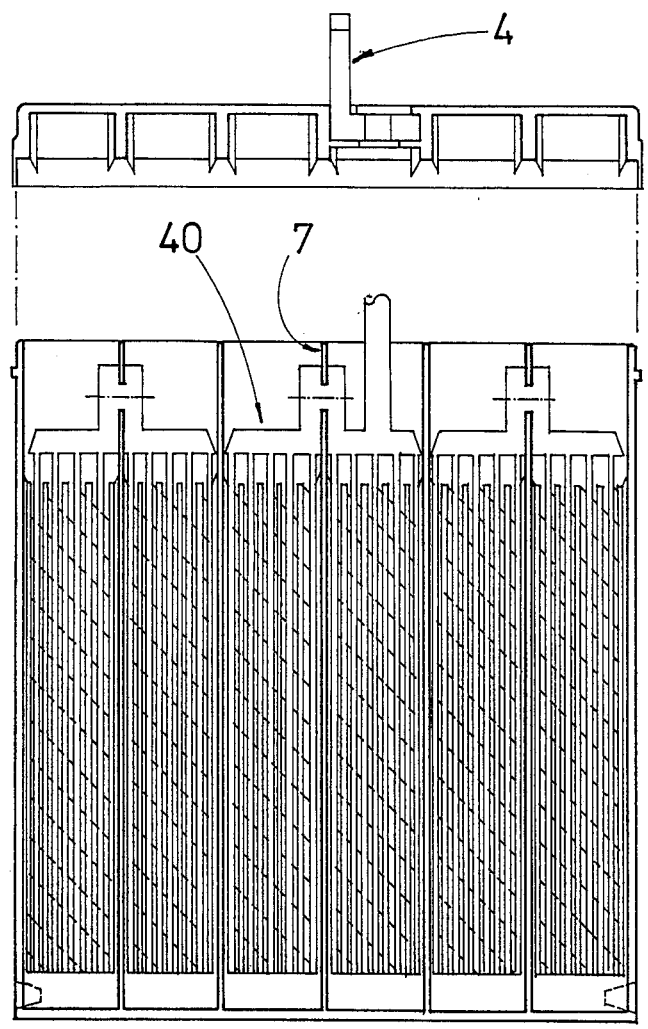
FIG. 5 is a end elevation of the battery sectioned through the negative terminal.

FIG. 5 shows a section through the negative terminal (4) of the present invention and indicates common negative terminal connections through partition (7) by strap (40).

Figure 6:
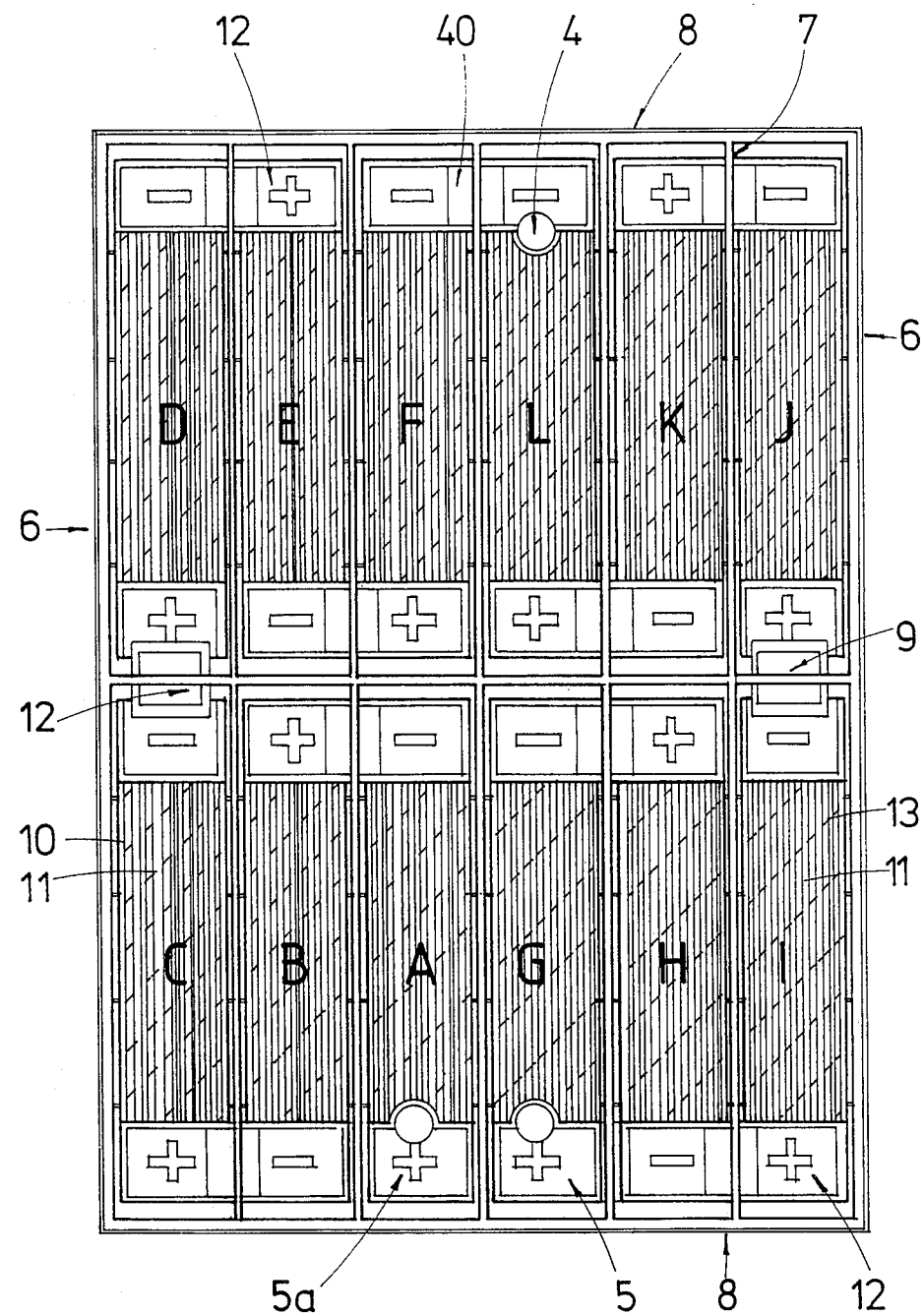
FIG. 6 is a top plane view of the battery with lid removed showing cells arranged in series parallel.

FIG. 6 is an overhead view of the cell compartments indicating partitions (7) and (9), intercell connections (12) and positive connections (5) and (5a) and negative connection (4) which indicate a series parallel arrangement of cells.

In accordance with the present invention, cells (a) to (f) of FIG. 6 have three laminated positive electrode plates (10) and conventional negative electrode plates (11). Cells (g) through (1) have four conventional positive electrode plates (13) and five conventional negative plates (11). Cells (a) to (f) are connected in series and parallel to cells (g) to (1) by straps (12). Cell (f) is connected through the partition to cell (1) by strap (40) at the negative terminal. Cells (a) and (g) show separate positive post to terminal (5) and (5a) of FIG. 1. Cell (1) shows a single negative post to terminal connection (4) of FIG. 1. Partition (9) as indicated previously is not required when absorbed electrolyte is used.

Figure 7:
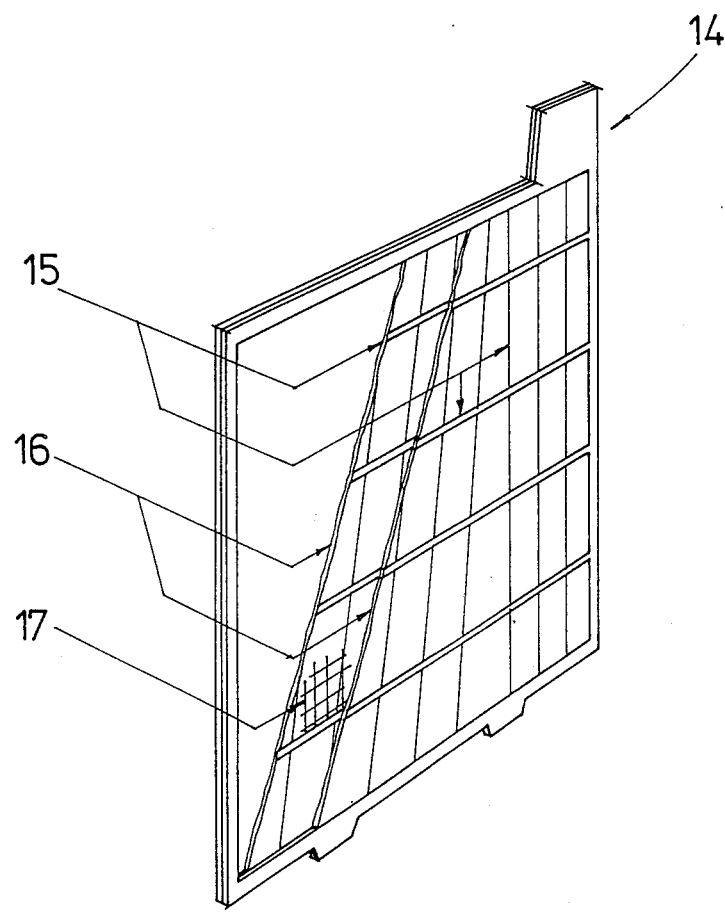
FIG. 7 is a perspective illustration of a laminated electrode plate structure.

FIG. 7 is a perspective view of a laminated electrode plate structure which indicates a section of active materials removed for clarity of illustration. A frame (14) has a similar appearance to conventional plate structures but consists of two or more frame structures placed against each other and having grids (15) which provide current paths which also restrain the active material (16). A glass fibre mat (17) is also illustrated which is placed between the frames (14) and grids (15) prior to "pasting" over from either side of plate frames with active materials.

Capillary action, enhanced by vehicle motion, allows electrolyte accessibility to the inner depths of the active material.

Whilst it is appreciated that greater surface area of active material directly increase by proportion the high current performance of a conventional battery, the present invention provides, by use of dual or multiple laminated positive electrode plates, not only high cranking current when required but also longer lasting but lower electrical current when being used for auxiliary loads. The use of laminated positive plates provide greater resistance to damage as a result of deep discharges that occur when the auxiliary circuits are operated for longer periods of time. The discharge/recharge cycle of a Lead-Acid battery places pressure on the positive plates in particular. A conventional SLI battery is in effect a design trade-off between a deep cycle battery, which uses thick positive plates to counter the effects of deep discharges and recharge cycles, and a battery having a greater number of thinner plates to provide the maximum high current for cranking but for relatively short periods of time.

When an internal combustion engine is being cranked, the current requirements are so great that rapid discharge occurs. However, because the discharge is so rapid, generally only the electrons at the plate surface are used. Electrons deeper into the active material may not be available until the cranking draw off is stopped for a period. A second attempt at cranking will produce a further flow of current. Thicker plates require more space volume to provide larger surface area for cranking power. Thicker plates also require longer recharge cycles.

The present invention overcomes the problems of plate stress caused by longer or deeper discharges resulting from prolonged auxiliary use. It is also effective in providing surface current for rapid discharges.

The use of laminated positive plates also places less recharge strain on the vehicle's generator/alternator which would be the case if thick plates are used. Thick plates as previously mentioned provide for deeper and longer discharges but also require deeper and longer recharges.

Thin laminated positive plates as in the present invention not only provide for greater strength than a thick plate of equal dimensions, but also makes it easier for the electrolyte to penetrate into the active material of the plates.

The cell configuration shown in FIG. 6 is only exemplary and many other configurations could be used as the particular design is not crucial.

Similarly, other multiples of plates within each cell may be employed depending on overall capacity requirements of the specifications. The combination of laminated plates also may include all cells depending on the specification requirements, or more or less cells than indicated in FIG. 6.

The use of thick, deep cycle plates, either in combination with laminated plates or thin plates, can also be used to provide alternative current "types".

Turning now to manufacturing costs. The present invention, as previously mentioned, is generally housed within the same dimensional parameters as an equivalent conventional SLI battery. Because the conventional battery is designed primarily as a cranking battery, emphasis has been directed to heavy intercell connectors so as to reduce resistance and thus enhance performance. The present invention, however, can provide a compromise by providing dual/multi currents at positive terminals in close proximity as indicated in FIG. 3. The intercell connectors may be comparatively reduced in weight as by circuit design it is possible to avoid a voltage drop at the ignition coil, resulting in a larger ignition spark and thereby reducing the required cranking capacity.

The active material used in the present invention is equal in weight and volume to a conventional SLI battery of the same dimensions. The lead grids used in the present invention are, in the case of the laminated configuration, moulded from pure lead. The laminations of the plates, as previously discussed, creates a stronger structure thus reducing the need for additives such as antimony or calcium. In this regard, the gassing problems created by the lead additives are reduced and the present invention, though able to "deep cycle", is also able to be manufactured as a "Maintenance Free" type battery.

The Monobloc Injection Moulded casing, FIG. 2, shows one extra partition (9) as compared to a conventional battery. This partition is required in the flooded electrolyte version of the battery. The partition, although apparently requiring more plastic material, has in fact created a saving by weight of material used. Partition (9) strengthens the casing by providing lateral support. This then allows a reduction in wall and partition thicknesses. For example, a conventional battery would have external walls measuring between 2.75 mm and 3.25 mm. Internal partitions on conventional batteries of similar size measure between 1.75 mm and 2.75 mm. The present invention, in wet form, because of the lateral support provided by partition (9), reduces the required thickness of the external walls (6) and (8) of FIG. 2 to between 2.0 mm and 2.75 mm. Similarly, the internal partitions can be reduced to between 1.50 and 1.75 mm. The additional plastic or polypropylene required for partition (9) is more than compensated for by the reduction in the thickness of all walls and partitions.

Calculations of manufacturing costs also must include plant alterations, etc. The present invention is designed to overcome the need for any plant alterations. Indeed, the battery can be manufactured by any well established Lead-Acid Battery manufacturer without any noticeable or major plant alterations. The injection moulding of the casing and lid would differ from those used for conventional batteries. The injection moulding operation is normally separated from the assembly procedures, so there are no problems of integration. The present invention's injection moulding requires no new material by weight or volume, and would not cost more than between 10% and 20% of the cost of manufacturing a conventional battery. When comparing it with the practice of using two batteries in an automobile, it is of course far cheaper.

Figure 8:
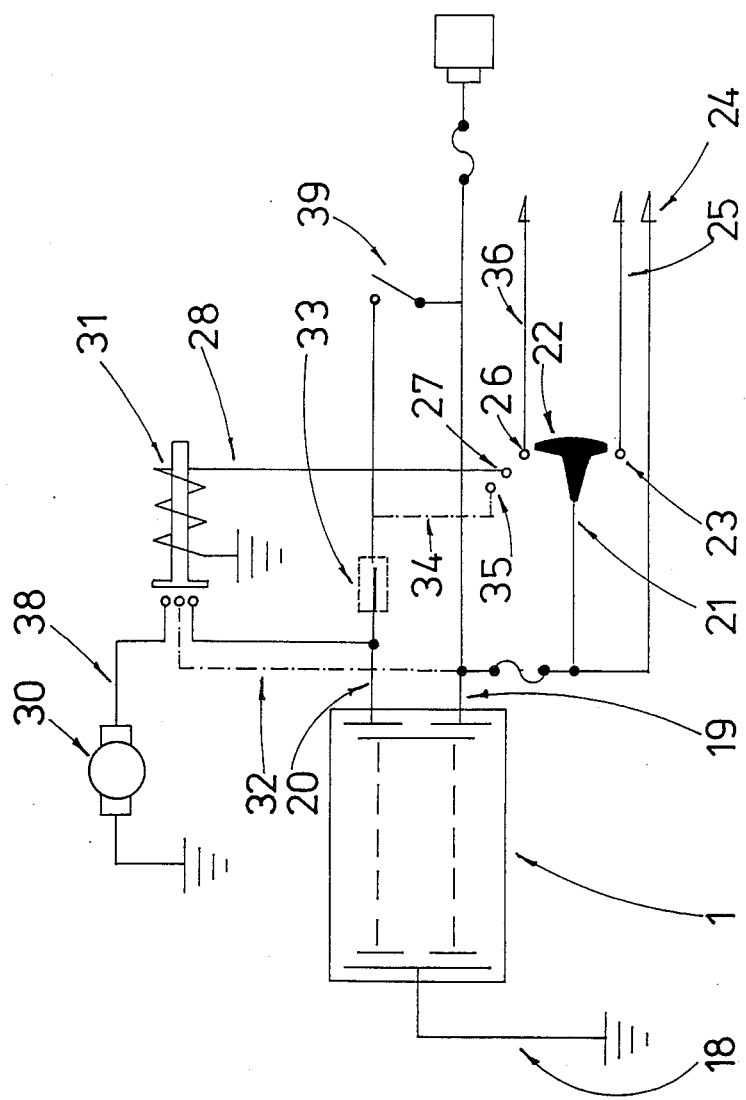
FIG. 8 is a diagrammatic view of an electrical layout usable with the battery of the invention.

FIG. 8 refers to a battery (1) of the type described herein as provided. The battery is earthed through earth connector (18). The battery provides two positive leads (19) and (20). Positive lead (19) is applied to the common terminal (21) of ignition switch (22). The ignition switch (22) may provide a spare terminal (23) which can be contacted by for example a reverse turn of the key from which extends electrical conductor (25) which may be used for example to allow a radio to play while the key is out. That is to say it can provide an electrical connection when the key is in an unlocked position. Lead (36) extending from terminal (26) is utilized for the auxiliaries and ignition circuits of the motor vehicle in which the battery (1) is to be used. The generator is connected directly to lead (19). Terminal (27) provides current through lead (28) to the solenoid (31) which is then activated to provide current to the starter motor (30) through lead (38). Lead (32) is an option and further high current lead from the second positive terminal. If this lead is provided it effectively connects the two parts of the battery in parallel thereby providing additional current capacity to the starter motor (30). When lead (32) is not provided a thermal cut off switch (33) is desirably provided. A solenoid switch can be provided in lead (34) which extends between a further terminal (35) in the ignition switch (22) and the positive lead (20). A trip switch (39) may be provided which is able to be operated by for example movement of the accelerator of the vehicle, the oil pressure switch, the voltage regulator, or some other item with the desired item being the accelerator so that the switch becomes closed as the accelerator is pressed. Switch (39) must be provided to allow for recharging of the battery in use eliminating the need for a diode in the circuit. Lead (24) is the general accessory lead which supplies current to vehicle accessories independent of the ignition switch.

Figure 9:
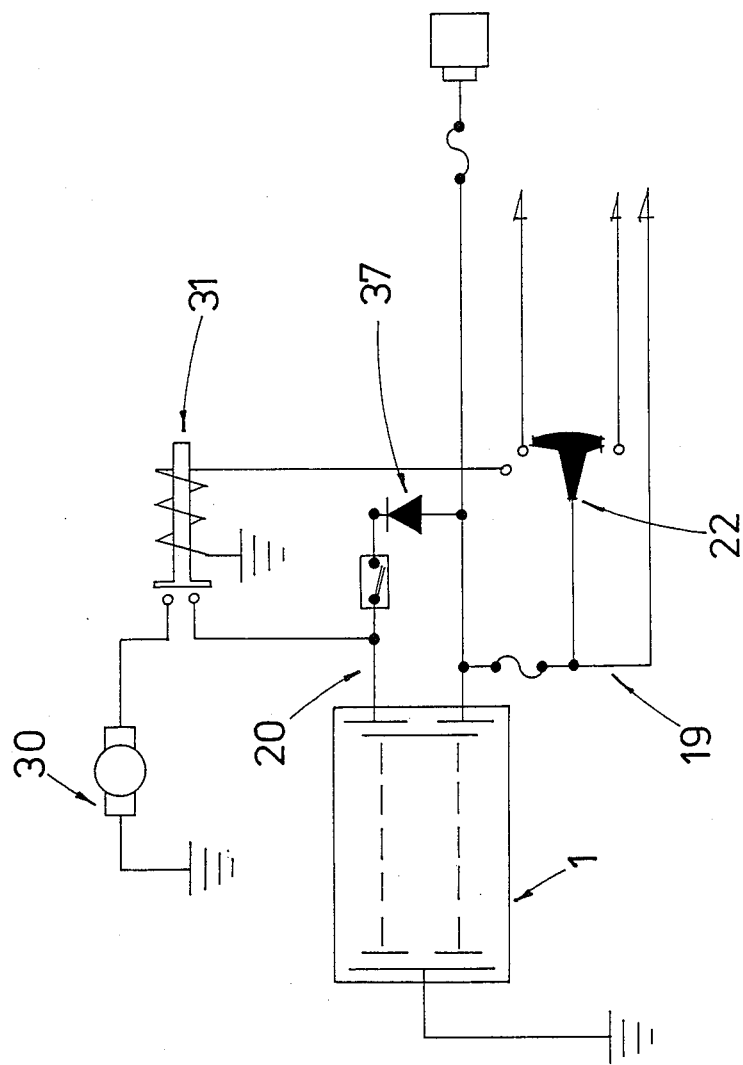
FIG. 9 is a diagrammatic view of an alternative electrical layout.

FIG. 9 shows the construction of the battery (1) being provided in substantially the same manner along with ignition switch (22) and positive leads (19) and (20). Between the positive leads (19) and (20) is connected a diode (37) which allows for recharging of the two parts of the battery during standard use in substantially the known manner and without the need to provide switch (36) or lead (32) of FIG. 8.

Thus it can be seen that at least in the preferred form of the invention, a battery is provided in which electrode plates are laminated structures which provide electrolyte accessibility deep within the available active material pasted thereon. A battery, which by combination of thicker and thinner electrode plates, the thickness determined by more or less laminations, arranged in cell structures that share a common earth terminal but have one or more positive terminals, which thereby provide through electrical scheme plan a discharge management capability of said cells and according to a current characteristic which is variable by choice of plate structure thickness.

I claim:

1. A battery comprising a container having a plurality of cells, said plurality of cells including at least two positive terminal cells and at least one negative terminal cell, each cell containing a plurality of alternating positive and negative electrode plates separated from each other and constituting a cell element stack, each of said plates including active material, the positive electrode plates of the cell element stack in each positive terminal cell being electrically connected to a positive terminal, the negative electrode plates of the cell element stack in the or each negative terminal cell being electrically connected to a single negative terminal, each electrode plate of each cell element other than a said terminal cell being electrically connected in series to the electrode plate of opposite polarity in an adjoining cell, the cells of each series of connections being electrically connected to one common negative terminal but having separate positive terminals; and an electrolyte in contact with the positive and negative electrode plates in each cell.

2. A battery as claimed in claim 1 wherein said positive terminals are in close proximity.

3. A battery as claimed in claim 1 wherein a combination of multiple thinner plate cells are in electrical parallel connection with multiple thicker plate cells.

4. A battery as claimed in any one of the preceding claims wherein at least some said plates comprise two or more laminations.

5. A battery as claimed in claim 1 wherein said electrolyte in each cell comprises (one of) an absorbed electrolyte (or dry electrolyte and a flooded electrolyte).

6. A battery as set forth in claim 1 wherein said plates are separated by a separator and said separators are impregnated with electrolyte and placed in dry form.

7. A battery as set forth in claim 4 wherein each lamination includes a lead grid, reinforcing material being provided between each lamination so that the lead structures within each cell require a minimum or no strengthening additives.

8. A battery as claimed in claim 1 having venting holes from each cell, said venting holes being covered with teflon to prevent liquid escape but to allow gas escape and/or recombination.

9. A battery as claimed in claim 4 wherein each said lamination includes a grid, said grid being of radial design.

10. A battery as claimed in claim 1 wherein said electrolyte in each cell comprises a dry electrolyte.

11. A battery as claimed in claim 4 wherein said electrolyte in each cell comprises a flooded electrolyte.

12. A battery as claimed in claim 10 wherein adjacent said plates are separated by a separator, said separators being impregnated with an electrolyte placed in dry form.

13. A battery as claimed in claim 10 wherein each lamination includes a lead grid, reinforcing material being provided between each lamination so that lead structures within each cell require a minimum or no strengthening additives.

14. An automobile electrical system comprising a battery according to any of the preceding claims with first a heavy current conductor cable connected to the battery negative terminal and earthed to said automobile, second a current conductor cable connected to one or more positive terminals of said battery and connected to a current first switch, said current switch being connected to the electric starter motor of said automobile, third a current conductor cable connected to one or more of the battery's positive terminals and to the auxiliary circuits of said automobile, fourth a current electrical conductor cable connected to one positive terminal not engaged by said second current connector cable, said fourth current conductor cable being in common circuit with the generator circuit line of said automobile, then to a second switch, fifth a current conductor cable from said second switch connected to said terminal engaged by said second current conductor cable.

15. An automobile electrical system as claimed in claim 14 wherein said second switch is turned on by depression of the accelerator of said automobile.

16. An automotive electrical circuit as claimed in claim 14 including a blocking diode between said positive terminals with current flow in the direction away from said generator line circuit.

17. An electrical circuit as claimed in claim 14 having a (thermal or other suitable) current overload circuit breaking switch between said positive terminals.

18. An electrical circuit as claimed in claim 14 wherein an extra contact is incorporated into the heavy starter motor switch, such switch being supplied with current from more than one positive terminal of said battery.

19. An electrical system as claimed in claim 14 wherein said electrical system includes an ignition switch, and a further terminal is included in said ignition switch which further terminal provides a connection between said positive terminals.

20. An electrical circuit as claimed in claim 17 wherein said current overload breaking switch is a thermal current overload circuit breaking switch.

* * * * *